April 27, 1937.  E. L. KRAFT  2,078,328
WINDSHIELD FOR AUTOMOBILES
Original Filed Sept. 2, 1931  2 Sheets-Sheet 1
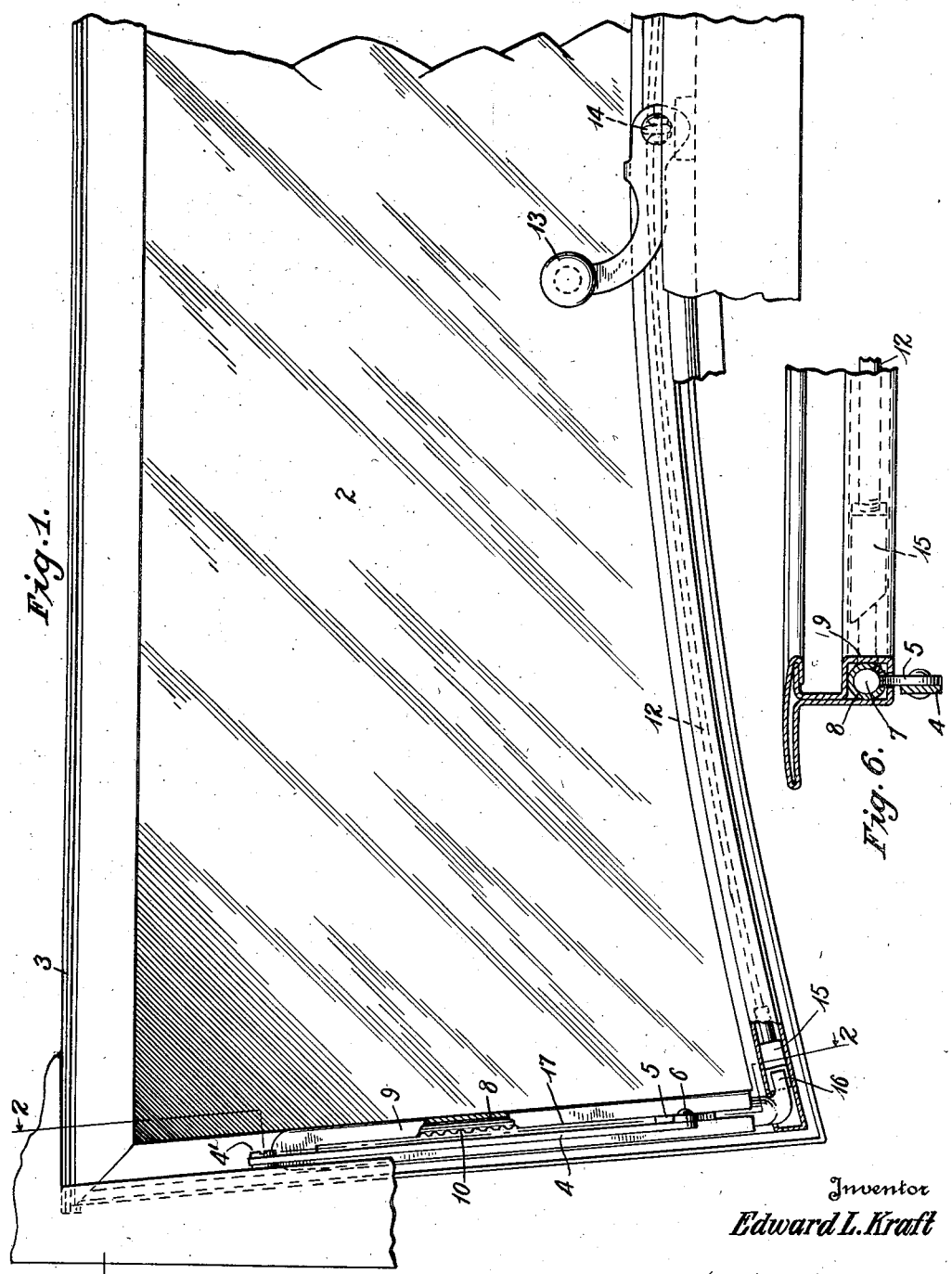
Inventor
Edward L. Kraft
By Bacon & Thomas
Attorneys

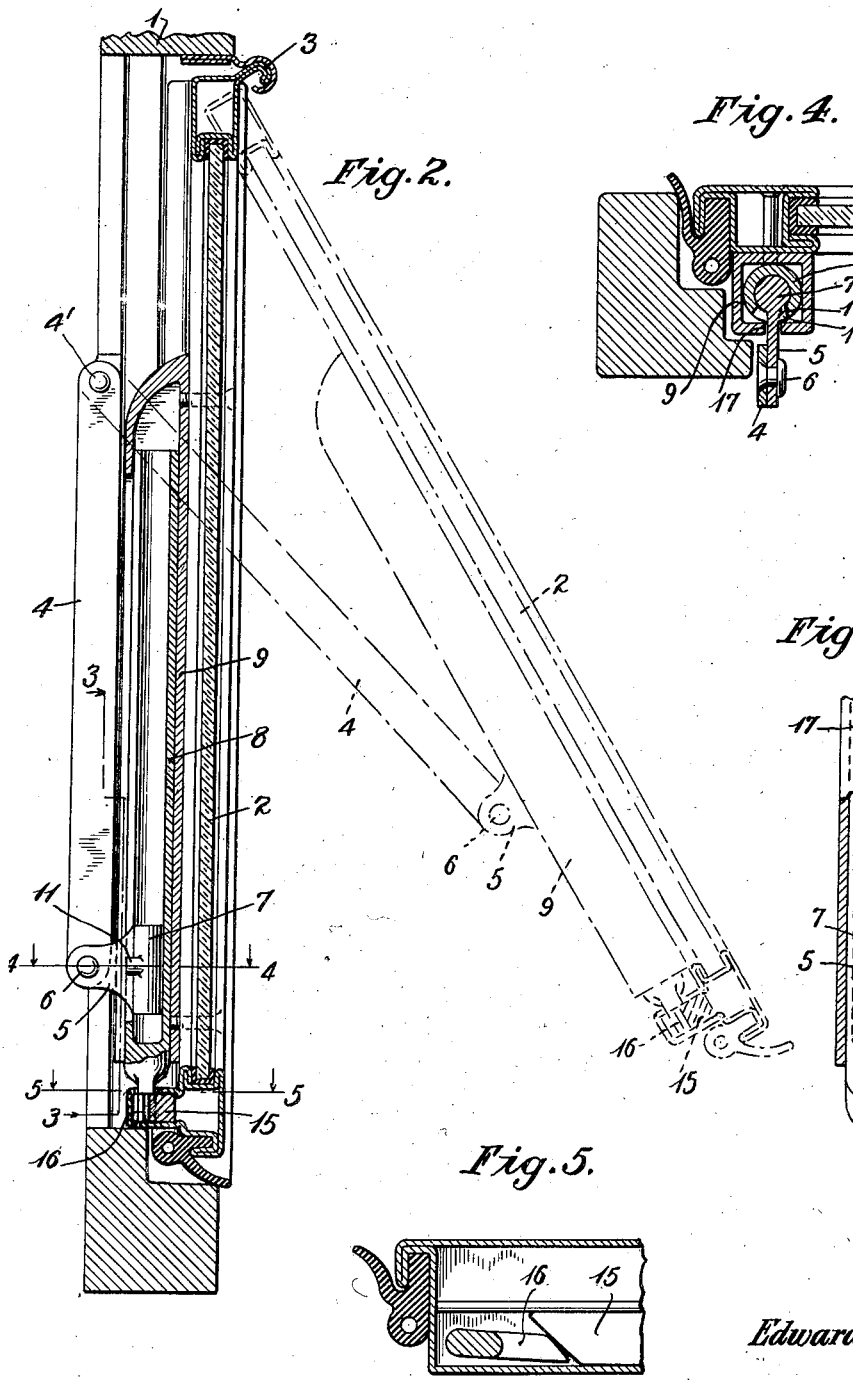

Patented Apr. 27, 1937

2,078,328

UNITED STATES PATENT OFFICE 2,078,328

WINDSHIELD FOR AUTOMOBILES

Edward L. Kraft, York, Pa., assignor, by mesne assignments, to Reconstruction Finance Corporation, Philadelphia, Pa., a corporation Application September 2, 1931, Serial No. 560,812
Renewed September 19, 1936

1 Claim. (Cl. 296—84)

This invention relates to adjusting mechanism for automobile windshields of the "mono-control" type and is an improvement upon Beitman application Serial No. 386,780, filed August 19, 1929.

The object of this invention is to provide a simple and inexpensive arrangement whereby all parts are concealed and whereby a simple actuation of the handle will release or lock the shield in its desired position of adjustment.

Other objects of the invention will be apparent from a reading of the following specification in conjunction with the drawings attached hereto and forming a part hereof in which—

Fig. 1 represents an elevation partly in section;

Fig. 2 represents a sectional side view taken on line 2—2 of Fig. 1;

Fig. 3 is a detail sectional view showing my improved locking mechanism and taken on line 3—3 of Fig. 2;

Fig. 4 is a similar view taken on line 4—4 of Fig. 2;

Fig. 5 is a detail sectional view of the improved camming actuation for the locking tube taken on line 5—5 of Fig. 2; and Fig. 6 is another detail view of a modified form for mounting the mechanism.

Referring now particularly to the drawings, 1 represents the windshield frame provided by the conventional automobile. The numeral 2 represents a swinging shield hinged at 3 in the usual manner. The shield may be provided with one or two bracing arms 4 pivoted as at 4' to the windshield. To the lower ends of these bracing arms is provided a locking lever 5 hinged at 6 to the brace arms 4. The locking lever is provided with the cylindrical part 7 adapted for sliding movement within the locking tube 8 which is preferably enclosed in a housing 9 secured to the windshield 2, as shown. The locking tube has a rack in one edge thereof including a number of closely spaced teeth, as shown at 10 while the locking lever has a tongue 11 engaging within any one of these teeth upon the rotation of the locking tube 8.

The lower marginal portion of the windshield has enclosed in the sash thereof operative connections in the form of longitudinally movable rods 12. These rods are movable upon the rotation of a handle 13 which has a cam 14 bearing thereagainst, as clearly shown in Fig. 1. Upon the actuation of this handle 13 and the consequent spreading movement of the rods 12, the cam 15 provided at the outer end of the rods moves into engagement with corresponding cam 16 to cause a rocking action thereof which in turn rocks the tube 8 into a position where the teeth or corrugations 10 engage the lip 11 provided by the locking lever 5. This positively prevents sliding action of the locking lever and the brace arm 4 relative to the sash and the window can thereby be adjusted and secured in adjusted position with utmost ease. For adjusting, the handle is pushed in a direction to release the lip 11 from the teeth 10 so that the locking lever 5 may slide freely within the locking tube and when the window has been adjusted as desired, the handle is moved which causes the rotational movement of the locking tube to bring the teeth and lip carried by the tube and locking lever respectively into interlocking relationship. It will be noted that the housing 9 is provided with a slot 17 so that the locking lever may freely slide therein.

In Fig. 6 the separate housing 9 is dispensed with and the tubular margin 19 of the windshield is used to house the locking tube 8 and the associated locking lever 5 with its cylindrical head 7. The same type of tongue 11 and teeth 10 are used in this form of the invention.

Having thus described my invention, what I claim is:

In combination, a windshield frame, a windshield swingingly mounted therein, a bracing arm pivoted at one end to the windshield frame and slidably associated at its other end with the movable shield, a locking lever provided by the bracing arm and pivoted thereto and having a cylindrical portion, a locking tube surrounding said cylindrical portion and rotative with respect thereto, interlocking connections between the locking tube and lever for restraining relative movement when desired, a handle associated with the windshield and rods actuated thereby, cooperating cams provided by the locking tube and the rods respectively whereby longitudinal movement of the rods caused by the actuation of the handle rocks the locking tube into a position for engaging the said interlocking connections between the lever and tube.

EDWARD L. KRAFT.